(12) United States Patent
Li (10) Patent No.: US 12,132,558 B2
(45) Date of Patent: Oct. 29, 2024

(54) METHOD AND DEVICE FOR ALLOCATING BEAM FAILURE DETECTION RESOURCES

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 350 days.

(21) Appl. No.: 17/774,106

(22) PCT Filed: Nov. 6, 2019

(86) PCT No.: PCT/CN2019/116066
§ 371 (c)(1),
(2) Date: May 3, 2022

(87) PCT Pub. No.: WO2021/087825
PCT Pub. Date: May 14, 2021

(65) Prior Publication Data
US 2022/0416873 A1     Dec. 29, 2022

(51) Int. Cl.
*H04B 7/08* (2006.01)
*H04W 24/08* (2009.01)
(Continued)

(52) U.S. Cl.
CPC ............ *H04B 7/088* (2013.01); *H04W 24/08* (2013.01); *H04W 72/02* (2013.01); *H04W 72/56* (2023.01)

(58) Field of Classification Search
CPC ..... H04B 7/088; H04B 7/0695; H04W 24/08; H04W 72/02; H04W 72/56;
(Continued)

(56) References Cited

U.S. PATENT DOCUMENTS

2019/0190582 A1   6/2019   Guo et al.
2019/0319833 A1   10/2019  Nagaraja et al.

FOREIGN PATENT DOCUMENTS

CN    111937437    *   4/2018   ............ H04W 36/08
WO    WO 2019138070 A1   7/2019
(Continued)

OTHER PUBLICATIONS

European Patent Application No. 19951790.5, Search and Opinion dated May 12, 2023, 10 pages.
(Continued)

*Primary Examiner* — Chi H Pham
*Assistant Examiner* — Raul Rivas
(74) *Attorney, Agent, or Firm* — Cozen O'Connor (57) ABSTRACT

A method for allocating beam failure detection resources includes determining control channel resource sets (CORESETs) configured by a network device for a terminal; in response to a number of the CORESETs being greater than a number of beam failure detection (BFD) resources supported by the terminal, selecting target CORESETs with a number of the BFD resources; and determining reference signal (RS) resources corresponding to transmission configuration indication (TCI) states of quasi co-locations (QCLs) of the selected target CORESETs as BFD RS resources. A device having a processor and memory may perform the method.

12 Claims, 3 Drawing Sheets

(51) Int. Cl.
*H04W 72/02* (2009.01)
*H04W 72/56* (2023.01)

(58) Field of Classification Search
CPC .......... H04W 36/0085; H04W 36/305; H04W 24/04; H04W 72/046; H04W 72/20; H04W 72/23; H04L 5/0023; H04L 5/0048; H04L 5/0053
See application file for complete search history.

(56) References Cited

FOREIGN PATENT DOCUMENTS

| WO | WO 2019184690 A1 | 10/2019 |
| WO | WO 2019215389 A2 | 11/2019 |

OTHER PUBLICATIONS

Mediatek Inc. "Summary #2 on Remaining issues on Beam Failure Recovery", 3GPP TSG RAN WG1 Meeting #94, R1-1809926, Aug. 2018, 30 pages.
Indian Patent Application No. 202247031947, Office Action dated Sep. 16, 2022, 7 pages.
PCT/CN2019/116066 International Search Report, dated Jul. 27, 2020 3 pages.
Mediatek Inc.: "Summary on Beam Failure Recovery", 3GPP TSG RAN WG1 Meeting #95, R1-1814069; Nov. 2018; 27 pages.
Nokia, Nokia Shanghai Bell; "Remaining issues on beam management"; 3GPP TSG RAN WG1 Meeting #94; R1-1809237; Aug. 2018; 10 pages.
Nokia, Nokia Shanghai Bell; "Maintenance for Beam Management"; 3GPP TSG RAN WG1 Meeting #94bis; R1-1811404; Oct. 2018; 4 pages.

* cited by examiner

METHOD AND DEVICE FOR ALLOCATING BEAM FAILURE DETECTION RESOURCES

CROSS-REFERENCE TO RELATED APPLICATION

This application is the US national phase application of International Application No. PCT/CN2019/116066, filed on Nov. 6, 2019, the entire contents of which are incorporated herein by reference.

TECHNICAL FIELD

The disclosure relates to the field of communication technologies, and in particular to a method for allocating beam failure detection resources, an apparatus for allocating beam failure detection resources and a storage medium.

BACKGROUND

In a new radio (NR) communication system, in order to ensure coverage area and resist path loss, generally, it is necessary to transmit and receive data based on beams. In the NR, since control channels also need to transmit and receive data based on beams, when a terminal moves or a direction of an antenna rotates, beam failure may occur for the beams currently configured for the terminal for transmission and reception.

In the related art, the terminal determines a reference signal (RS) corresponding to a transmission configuration indication (TCI) state of a quasi co-location (QCL) of a component carrier (CC)/bandwidth part (BWP) control channel resource set (CORESET) as a beam failure detection (BFD) resource. The RS resources configured to detect beam failure are also referred to as BFD RS resources. If the terminal detects that channel qualities of all BFD RSs in the BFD RS resources are less than a preset threshold, it indicates that a beam failure has occurred.

At present, a number of RS resources that can be selected by the terminal as BFD RS may be greater than a number of RS resources supported by the terminal. In this case, selection of RS resources for beam failure detection is a problem to be solved.

SUMMARY

Embodiments of a first aspect of the disclosure provide a method for allocating beam failure detection resources. The method includes: determining CORESETs configured by a network device for a terminal; selecting target CORESETs with a number of BFD resources in response to a number of the CORESETs being greater than the number of BFD resources supported by the terminal; and determining RS resources corresponding to TCI states of QCLs of the target CORESETs as BFD RS resources.

Embodiments of a second aspect of the disclosure provide an apparatus for allocating beam failure detection resources. The apparatus includes: a processor; and a memory configured to store instructions executable by the processor. The processor is configured to: determine control channel resource sets (CORESETs) configured by a network device for a terminal; in response to a number of the CORESETs being greater than a number of beam failure detection (BFD) resources supported by the terminal, select target CORESETs with a number of the BFD resources; and determine reference signal (RS) resources corresponding to transmission configuration indication (TCI) states of quasi co-locations (QCLs) of the selected target CORESETs as BFD RS resources.

Embodiments of a third aspect of the disclosure provide a non-transitory computer-readable storage medium. When instructions in the storage medium are executed by a processor of a mobile terminal, the mobile terminal is enabled to implement the method for allocating beam failure detection resources as described in the first aspect.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

Figure 1:
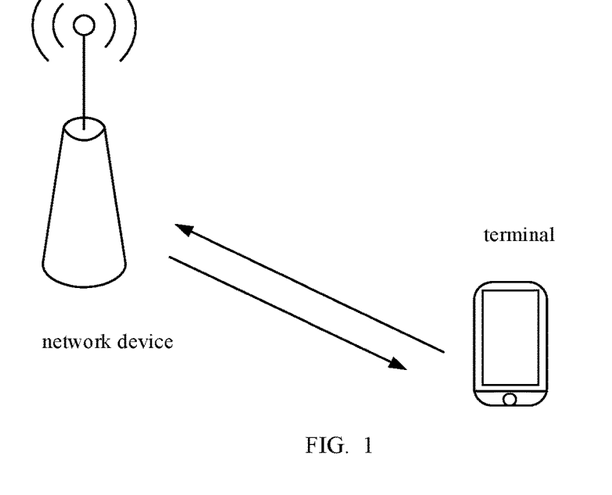
FIG. 1 is a schematic diagram of a wireless communication system according to an embodiment.

A method for allocating BFD resources of embodiments of the disclosure can be applied to a wireless communication system shown in FIG. 1. As illustrated in FIG. 1, the wireless communication system includes a network device and a terminal. The terminal is connected to the network device through wireless resources, and configured to perform data transmission.

It can be understood that the wireless communication system in FIG. 1 is only a schematic illustration, and the wireless communication system may further include other network devices, such as core network devices, wireless relay devices and wireless backhaul devices, which are not shown in FIG. 1. Embodiments of the disclosure do not limit the number of network devices and the number of terminals included in the wireless communication system.

It can be further understood that the wireless communication system according to embodiments of the disclosure is a network providing a wireless communication function. The wireless communication system can employ different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), and carrier sense multiple access with collision avoidance. Networks can be divided into second generation (i.e., 2G) networks, 3G networks, 4G networks or future evolution networks, such as 5G networks, which can also be called NR networks. For convenience of description, the wireless communication network is called a network for short sometimes in the present disclosure.

Further, the network device in the disclosure may also be referred to as a radio access network device. The radio access network device may be: a base station, an evolved base station (evolved node B), a home base station, an access point (AP) in a wireless fidelity (WIFI) system, a wireless relay node, a wireless backhaul node, a transmission point (TP) or a transmission and reception point (TRP), and the radio access network device may also be a gNB in an NR system, or a component or part of a device that constitutes a base station. It should be understood that, in embodiments of the disclosure, specific technologies and device forms adopted by the network device are not limited. In the disclosure, the network device may provide communication coverage for a specific geographic area, and may communicate with terminals located within a coverage area (a cell). In addition, when it is a vehicle-to-everything (V2X) communication system, the network device may also be an in-vehicle device.

Moreover, the terminal involved in the disclosure may also be referred to as terminal equipment, user equipment (UE), mobile station (MS) and mobile terminal (MT), which is a device that provides speech and/or data connectivity to a user. For example, the terminal may be a handheld device or a vehicle-mounted device having a wireless connection function. Currently, some examples of the terminal are: a mobile phone, a pocket personal computer (PPC), a PDA, a personal digital assistant (PDA), a notebook computer, a tablet computer, a wearable device and a vehicle-mounted device. In addition, when it is a V2X communication system, the terminal device may also be an in-vehicle device. It should be understood that embodiments of the disclosure do not limit the specific technologies and specific device forms adopted by the terminal.

In the NR, especially when the communication frequency band is in frequency range 2, since high-frequency channel attenuates rapidly, in order to ensure the coverage area, transmission and reception based on the beams need to be used between the terminal and the network device.

In the NR, since the control channels also need to perform transmission and reception based on the beams, when the terminal moves or the direction of the antenna rotates, the beams currently configured for the terminal for transmission and reception may have problems, that is, beam failures may occur. For example, a transmission beam or reception beam currently configured for the terminal for transmitting and receiving a physical downlink control channel (PDCCH) may have a problem, that is, beam failures may occur. The existing standard defines RS resources for beam failure detection. The RS resources for detecting beam failure is also referred to as BFD RS resources. If the terminal detects that the channel qualities of all BFD RSs in the BFD RS resources are lower than the preset threshold, it indicates that beam failure has occurred.

In the related art, the BFD RS resources may be configured by the network device for the terminal. For example, the network device configures two or three BFD RS resources for the terminal. When the network device does not configure BFD RS resources for the terminal, the terminal can determine a RS resource corresponding to a TCI state of a QCL of a CC/BWP CORESET as a BFD RS resource. However, for a single TRP (transmission and reception point), on each CC/BWP, the network device can configure at most three CORESETs for the terminal, and each CORESET corresponds to a TCI state. For multi-TRP, on each CC/BWP, the network device can configure up to 5 CORESETs for the terminal, and each CORESET corresponds to one TCI state. That is, the number of RS resources that can be selected by the terminal as BFD RSs may be greater than the number of RS resources supported by the terminal. In this case, how to select RS resources for beam failure detection is a problem to be solved.

In view of this, embodiments of the disclosure provide a method for allocating beam failure detection resources. In the method for allocating beam failure detection resources, when the number of CORESETs is greater than the number of BFD RS resources supported by the terminal, target CORESETs that match the number of BFD RS resources are selected, and the RS resources corresponding to the TCI states of the QCLs of the selected target CORESETs are determined as the BFD RS resources. For example, if the number of BFD RS resources supported by the terminal configured by the network device for the terminal is 2, but the network device does not configure the corresponding BFD RS resources for the terminal, the terminal may select 2 CORESETs for each TRP among 3 CORESETs or 5 CORESETs as the target CORESETs, and the RS resources corresponding to the TCI states of the QCLs of the two target CORESETs are used as the BFD RS resources.

Figure 2:
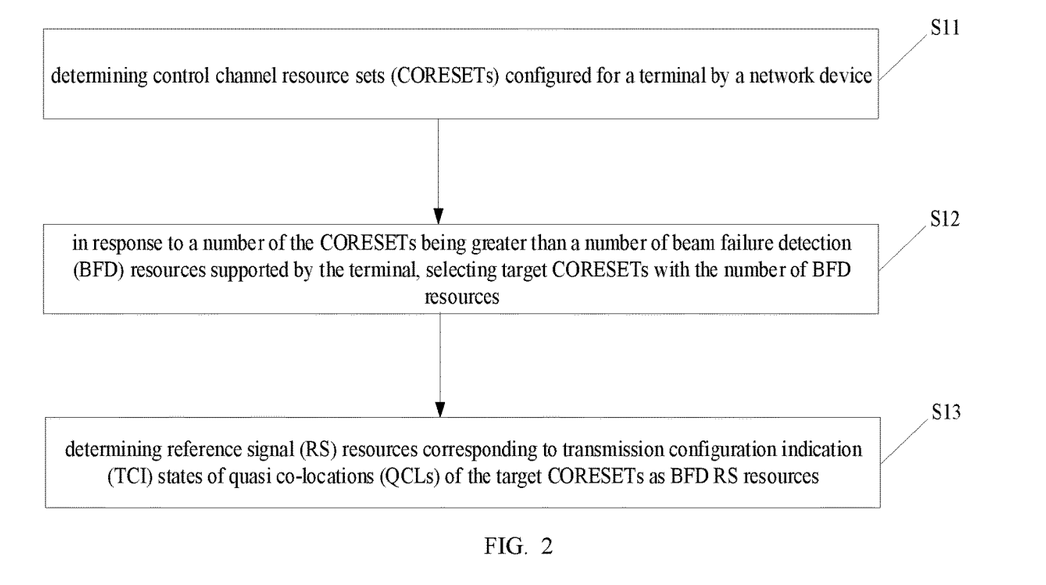
FIG. 2 is a flowchart of a method for allocating BFD RS resources according to an embodiment.

FIG. 2 is a flowchart of a method for allocating BFD RS resources according to an embodiment. As illustrated in FIG. 2, the method for allocating BFD RS resources is applied in a terminal, and the method includes the following steps.

In S11, CORESETs configured for a terminal by a network device are determined.

In embodiments of the disclosure, the number of CORESETs configured for the terminal by the network device may be three or five. For example, for a single TRP, on each CC/BWP, the network device can configure at most 3 CORESETs for the terminal, and each CORESET corresponds to one TCI state. For multi-TRP, on each CC/BWP, the network device can configure up to 5 CORESETs for the terminal.

In S12, in response to a number of the CORESETs being greater than a number of BFD RS resources supported by the terminal, target CORESETs with the number of BFD RS resources are selected.

Generally, the number of BFD RS resources supported by the terminal is 2 or 3. When the number of BFD RS resources supported by the terminal is 2, in a case where a single TRP is configured with 3 CORESETs or a multi-TRP is configured with 5 CORESETs, it can be understood that the number of CORESETs is greater than the number of BFD RS resources supported by the terminal.

When the number of CORESETs is greater than the number of BFD RS resources supported by the terminal, the target CORESETs with the number of BFD RS resources are selected. For example, if the maximum number of BFD RS resources supported by the terminal is 2, the network device does not configure the corresponding BFD RS resources for the terminal, but the network device configures 3 CORESETs or 5 CORESETs for the terminal, then the terminal can select 2 CORESETs from the 3 CORESETs or 5 CORESETs as the target CORESETs for each TRP.

In S13, RS resources corresponding to TCI states of QCLs of the target CORESETs are determined as BFD RS resources.

For example, in the above example, the RS resources corresponding to the TCI states of the QCLs of the two target CORESETs may be determined as the BFD RS resources in embodiments of the disclosure.

In embodiments of the disclosure, when the number of CORESETs is greater than the number of BFD RS resources supported by the terminal, the target CORESETs matching the number of BFD RS resources are selected, and the RS resources corresponding to the TCI states of the QCLs of the target CORESETs are determined as the BFD RS resources, realizing determination of the BFD RS resources when the number of CORESETs is greater than the number of BFD RS resources supported by the terminal.

In embodiments of the disclosure, when selecting the target CORESETs with the number of BFD RS resources supported by the terminal from the plurality of CORESETs, the CORESETs configured for the terminal can be divided into groups, the CORESETs belonging to the same TRP are divided into one group, and then the target CORESETs are selected according to the number of CORESETs in each group.

Figure 3:
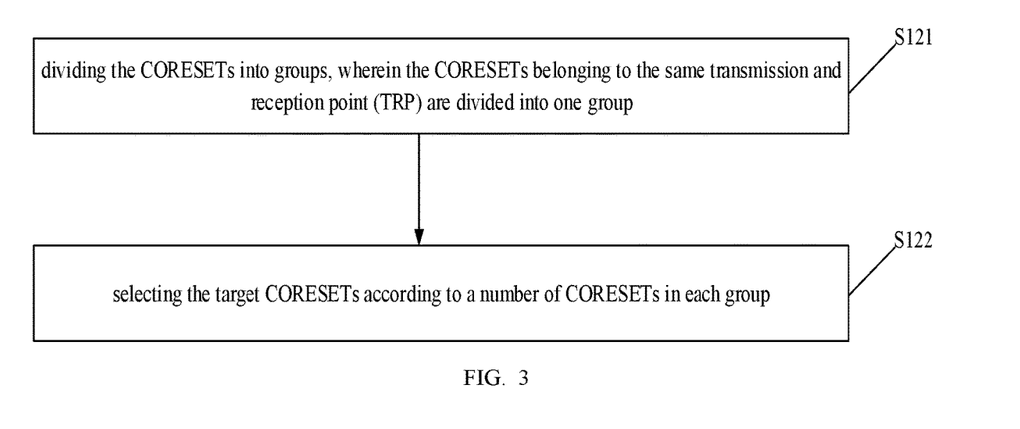
FIG. 3 is a flowchart of selecting target CORESETs according to a number of BFD RS resources supported by a terminal according to an embodiment.

FIG. 3 is a flowchart of selecting target CORESETs with a number of BFD RS resources supported by a terminal according to an embodiment. As illustrated in FIG. 3, the mode includes the following steps.

In S121, the CORESETs configured for the terminal are divided into groups, in which the CORESETs belonging to the same TRP are divided into one group.

In S122, the target CORESETs are selected according to a number of CORESETs in each group.

In embodiments of the disclosure, when the CORESETs configured for the terminal are divided into groups, it is determined whether each CORESET is configured with a higher layer signaling index to determine whether the CORESETs belong to the same TRP, and the CORESETs are divided into groups, so that the CORESETs belonging to the same TRP can be divided into the same group. After dividing the CORESETs into groups, the target CORESET can be selected respectively for each TRP.

Figure 4:
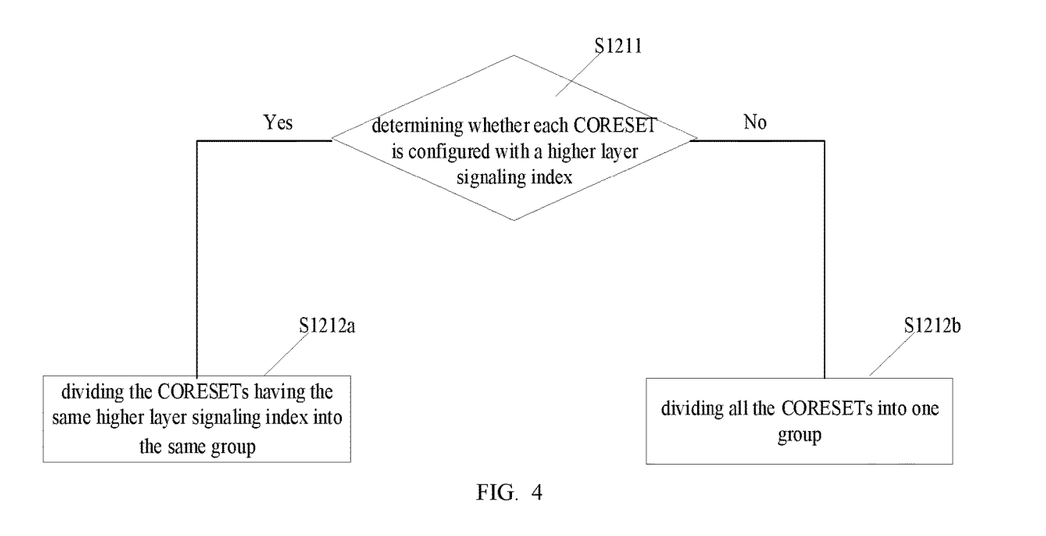
FIG. 4 is a flowchart of dividing the CORESETs configured for the terminal into groups according to an embodiment.

FIG. 4 is a flowchart of dividing the CORESETs configured for the terminal into groups according to an embodiment. As illustrated in FIG. 4, the mode includes the following steps.

In S1211, it is determined whether each CORESET is configured with a higher layer signaling index.

If each CORESET is configured with the higher layer signaling index, step S1212a is executed. If a CORESET is not configured with the higher layer signaling index, step S1212b is executed.

In S1212a, the CORESETs having the same higher layer signaling index are divided into the same group in response to each CORESET being configured with the higher layer signaling index.

In S1212b, all the CORESETs are divided into one group in response to a CORESET not being configured with the higher layer signaling index.

In embodiments of the disclosure, after the CORESETs are divided into groups, the target CORESETs may be selected according to the number of CORESETs in each CORESET group. In an implementation, when the number of CORESETs in the group is less than or equal to the number of BFD RS resources supported by the terminal, all CORESETs in the group are selected as the target CORESETs. In another implementation, when the number of CORESETs in the group is greater than the number of BFD RS resources supported by the terminal, the CORESETs with the number of BFD RS resources supported by the terminal are selected in a specified priority order and determined as the target CORESETs.

In embodiments of the disclosure, the above-mentioned specified priority order may be preset. For example, the specified priority order may be one or more of the following priority orders: a priority order of identifier (ID) numbers of the CORESETs from small to large; a priority order of priorities corresponding to a cell common search space CORESET, a group common search space CORESET, and a user specific search space CORESET from high to low; and a priority order of intervals of monitoring the CORESETs by the terminal from small to large.

In embodiments of the disclosure, the number of BFD RS resources supported by the terminal being 2 and the number of CORESETs in the group being 3 is taken as an example for description.

When selecting the target CORESETs according to the priority order of the CORESET ID numbers from small to large, the CORESETs with small ID numbers are selected and the CORESETs with the largest ID number is discarded. For example, if the CORESET IDs are 0, 1, and 2, the CORESETs with IDs 0 and 1 are selected, and the CORESET with ID 2 is discarded. Certainly, in embodiments of the disclosure, the target CORESETs may also be selected according to the priority order of CORESET ID numbers from large to small, that is, the CORESETs with large CORESET IDs are selected, and the CORESET with the smallest CORESET ID is discarded.

When the target CORESETs are selected according to the priority order of priorities corresponding to cell common search space CORESET, group common search space CORESET and user specific search space CORESET from high to low, the CORESET for all terminals in the cell has the highest priority, for example, Type0-PDCCH CSS set configured to indicate time-frequency resources of SIB1, Type0A-PDCCH CSS set configured to indicate other system information time-frequency resources, Type1-PDCCH CSS set configured to indicate random access resources, and Type2-PDCCH CSS set configured to indicate paging time-frequency resources have the highest priority, and the cell common search space CORESET is preferentially selected as the target CORESET. The priority of the CORESET for a group of terminals, for example, Type3-PDCCH CSS set configured to indicate the time slot format and power control of terminal transmission, is the second. The priority of user specific search space CORESET for a specific terminal has the lowest priority. That is, cell common search space CORESET and group common search space CORESET are selected, and user specific search space CORESET is discarded. Certainly, in embodiments of the disclosure, the target CORESETs may also be selected according to the priority order of priorities corresponding to user specific search space CORESET, group common search space CORESET, and cell common search space CORESET from high to low. For example, user specific search space CORESET and group common search space CORESET may be selected, and cell common group common search space CORESET may be discarded.

In embodiments of the disclosure, when the target CORESETs are selected according to the priority order of intervals of monitoring the CORESETs by the terminal from small to large, two CORESETs with the shortest intervals at which the terminal monitors the CORESETs may be selected. Since the network device will configure the terminal to monitor each CORESET, the shortest the interval, the more frequent the monitoring. Therefore, in embodiments of the disclosure, two CORESETs with the shortest intervals are selected as the target CORESETs. Certainly, in embodiments of the disclosure, the target CORESETs may also be selected according to the priority order of intervals of monitoring the CORESETs by the terminal from large to small, that is, two CORESETs with the longest intervals are selected as the target CORESETs.

It can be understood that the implementation process of selecting the target CORESETs according to the specified priority order in the above embodiments of the disclosure may be applicable to the situation that the number of CORESETs configured for a single TRP is greater than the number of BFD RS resources supported by the terminal. For example, when the number of CORESETs configured for a single TRP is 3, and the number of BFD RS resources supported by the terminal is 2, the target CORESETs can be selected according to the above priority order, and the RS resources corresponding to the TCI states of the QCLs of the selected target CORESETs can be determined as the BFD RS resources.

It can be further understood that, the implementation of dividing the CORESETs into groups according to the higher layer signaling indexes, and selecting the target CORESETs according to the number of CORESETs in each group in the above-mentioned embodiments of the disclosure can be applied to the situation that the number of CORESETs configured for the multi-TRP is greater than the number of BFD RS resources supported by the terminal.

In the method for allocating BFD RS resources in the above embodiments of the disclosure, when the number of CORESETs configured for the terminal is greater than the number of BFD RS resources supported by the terminal, the CORESETs matching the number of BFD RS resources supported by the terminal are selected as the target CORESETs, and the RS resources corresponding to the TCI states of the QCLs of the selected target CORESETs are determined as the BFD RS resources, to realize the determination of the BFD RS resources.

Based on the same concept, embodiments of the disclosure also provide an apparatus for allocating BFD RS resources.

It can be understood that, in order to implement the above functions, the apparatus for allocating BFD RS resources of embodiments of the disclosure includes hardware structures and/or software modules for executing each function. Combining with units and algorithm steps of each example disclosed in embodiments of the disclosure, embodiments of the disclosure can be implemented by hardware or a combination of hardware and computer software. Whether a function is implemented by hardware or using computer software to drive hardware depends on the specific application and design constraints of the technical solution. Those skilled in the art may use different methods to implement the described functions for each specific application, but such implementation should not be considered as beyond the scope of the technical solution of embodiments of the disclosure.

Figure 5:
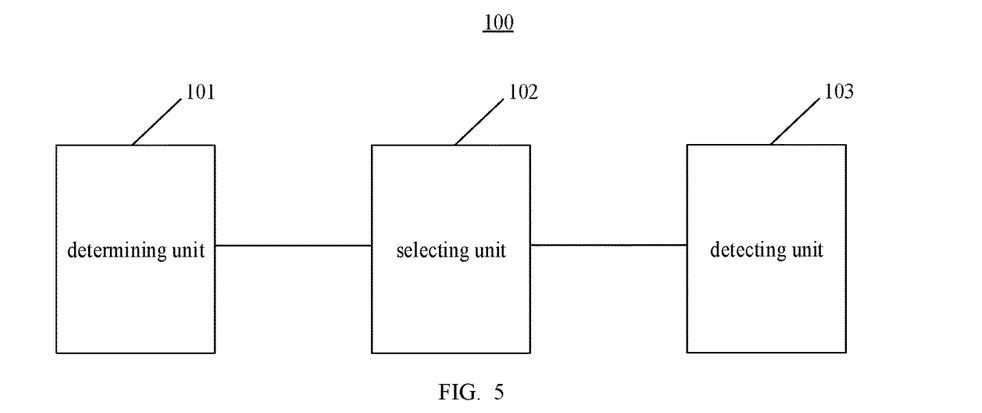
FIG. 5 is a block diagram of an apparatus for allocating BFD RS resources according to an embodiment.

FIG. 5 is a block diagram of an apparatus for allocating BFD RS resources according to an embodiment. As illustrated in FIG. 5, the apparatus for allocating BFD RS resources 100 includes: a determining unit 101, a selecting unit 102 and a detecting unit 103.

The determining unit 101 is configured to determine CORESETs configured by a network device for a terminal. The selecting unit 102 is configured to select target CORESETs with a number of BFD RS resources supported by the terminal in response to a number of the CORESETs being greater than the number of BFD RS resources supported by the terminal. The detecting unit 103 is configured to determine RS resources corresponding to TCI states of QCLs of the target CORESETs as BFD RS resources.

In an embodiment, the selecting unit 102 is configured to select the target CORESETs with the number of BFD RS resources in a following manner: dividing the CORESETs into groups, in which the CORESETs belonging to the same TRP are divided into one group; and selecting the target CORESETs according to a number of CORESETs in each group.

In another embodiment, the selecting unit 102 is configured to divide the CORESETs into groups in a following manner: determining whether each CORESET is configured with a higher layer signaling index; dividing the CORESETs having the same higher layer signaling index into the same group in response to each CORESET being configured with the higher layer signaling index; and dividing all the CORESETs into one group in response to a CORESET not being configured with the higher layer signaling index.

In an embodiment, the selecting unit 102 is configured to select the target CORESETs according to the number of CORESETs in each group in a following manner:

determining the CORESETs in the group as the target CORESETs in response to a number of CORESETs in the group being less than or equal to the number of BFD RS resources supported by the terminal; and in response to the number of CORESETs in the group being greater than the number of BFD RS resources supported by the terminal, selecting the CORESETs with the number of BFD RS resources in a specified priority order as the target CORESETs.

The specified priority order includes one or more of the following: a priority order of ID numbers of the CORESETs from small to large; a priority order of priorities corresponding to a cell common search space CORESET, a group common search space CORESET, and a user specific search space CORESET from high to low; and a priority order of intervals of monitoring the CORESETs by the terminal from small to large.

Regarding the apparatus in the above-mentioned embodiments, the specific manner in which each module performs operations has been described in detail in embodiments of the method, and will not be described in detail here.

Figure 6:
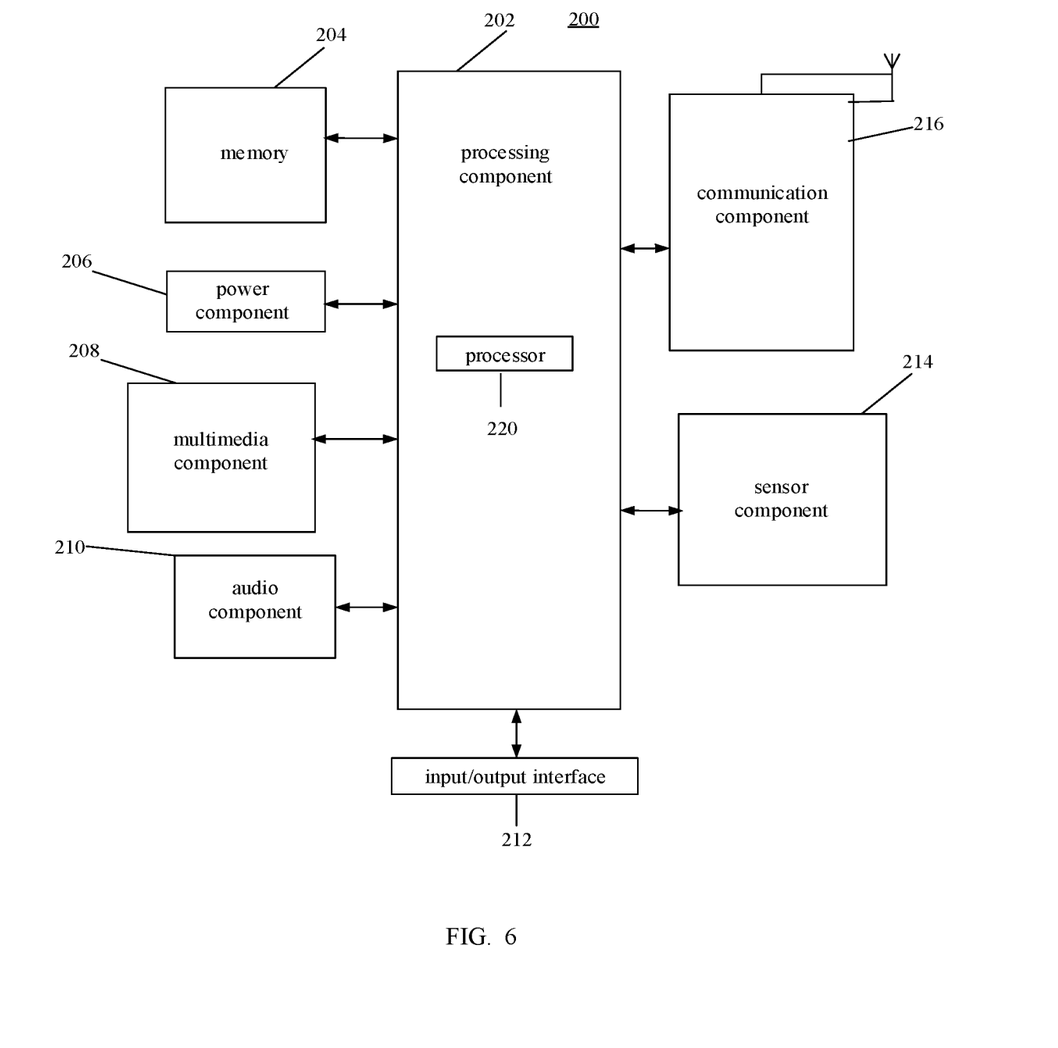
FIG. 6 is a block diagram of an apparatus for allocating BFD RS resources according to an embodiment.

FIG. 6 is a block diagram of an apparatus 200 for allocating BFD RS resources according to an embodiment. For example, the apparatus 200 may be a mobile phone, a computer, a digital broadcasting terminal, a message transceiver device, a game console, a tablet device, a medical device, a fitness device and a personal digital assistant.

As illustrated in FIG. 6, the apparatus 200 may include one or more of the following components: a processing component 202, a memory 204, a power component 206, a multimedia component 208, an audio component 210, an input/output (I/O) interface 212, a sensor component 214, and a communication component 216.

The processing component 202 generally controls overall operation of the apparatus 200, such as the operations associated with display, telephone calls, data communications, camera operations, and recording operations. The processing component 202 may include one or more processors 220 to execute instructions to perform all or part of the steps in the above described method. Moreover, the processing component 202 may include one or more modules which facilitate the interaction between the processing component 202 and other components. For instance, the processing component 202 may include a multimedia module to facilitate the interaction between the multimedia component 208 and the processing component 202.

The memory 204 is configured to store various types of data to support the operation of the apparatus 200. Examples of such data include instructions for any applications or methods operated on the apparatus 200, contact data, phonebook data, messages, pictures, video, etc. The memory 204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 206 provides power to various components of the apparatus 200. The power component 206 may include a power management system, one or more power sources, and any other components associated with the generation, management, and distribution of power in the apparatus 200.

The multimedia component 208 includes a screen providing an output interface between the apparatus 200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 208 includes a front-facing camera and/or a rear-facing camera. When the apparatus 200 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 210 is configured to output and/or input audio signals. For example, the audio component 210 includes a microphone (MIC) configured to receive an external audio signal when the apparatus 200 is in an operation mode, such as a call mode, a recording mode, and a voice recognition mode. The received audio signal may be further stored in the memory 204 or transmitted via the communication component 216. In some embodiments, the audio component 210 further includes a speaker to output audio signals.

The I/O interface 212 provides an interface between the processing component 202 and peripheral interface modules, such as a keyboard, a click wheel, buttons, and the like. The buttons may include, but are not limited to, a home button, a volume button, a starting button, and a locking button.

The sensor component 214 includes one or more sensors to provide status assessments of various aspects of the apparatus 200. For instance, the sensor component 214 may detect an open/closed status of the apparatus 200, relative positioning of components, e.g., the display and the keypad, of the apparatus 200, a change in position of the apparatus 200 or a component of the apparatus 200, a presence or absence of user contact with the apparatus 200, an orientation or an acceleration/deceleration of the apparatus 200, and a change in temperature of the apparatus 200. The sensor component 214 may include a proximity sensor configured to detect the presence of nearby objects without any physical contact. The sensor component 214 may also include a light sensor, such as a CMOS or CCD image sensor, for use in imaging applications. In some embodiments, the sensor component 214 may also include an accelerometer sensor, a gyroscope sensor, a magnetic sensor, a pressure sensor, or a temperature sensor.

The communication component 216 is configured to facilitate communication, wired or wirelessly, between the apparatus 200 and other devices. The apparatus 200 can access a wireless network based on a communication standard, such as WiFi, 2G, or 3G, or a combination thereof. In an embodiment, the communication component 216 receives a broadcast signal or broadcast associated information from an external broadcast management system via a broadcast channel. In an embodiment, the communication component 216 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In embodiments, the apparatus 200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In embodiments, there is also provided a non-transitory computer readable storage medium including instructions, such as included in the memory 204, executable by the processor 220 in the apparatus 200, for performing the above method. For example, the non-transitory computer-readable storage medium may be a ROM, a RAM, a CD-ROM, a magnetic tape, a floppy disc, an optical data storage device, and the like.

It should be understood that "several" mentioned in the disclosure refers to one or more, and "a plurality of" refers to two or more. The term "and/or" describes an association relationship among the associated objects, indicating that there are three types of relationships, for example, A and/or B, i.e., A alone exists, A and B exist at the same time, and B exists alone. The character "/" generally indicates that the associated objects before and after are in an "or" relationship. The singular forms "a", "said" and "the" are also intended to include plural forms, unless the context clearly indicates other meanings.

It can be further understood that the terms "first" and "second" are used to describe various information, but the information should not be limited to these terms. These terms are only used to distinguish the same type of information from each other, and do not indicate a specific order or degree of importance. In fact, expressions such as "first" and "second" can be used interchangeably. For example, without departing from the scope of the disclosure, the first information may also be referred to as second information, and similarly, the second information may also be referred to as the first information.

It is understood that, although the operations are described in a specific order in the drawings in embodiments of the disclosure, the operations do not need to be performed in the specific order shown or in a serial order, or are required to be performed to get a desired result. In certain circumstances, multitasking and parallel processing may be advantageous.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for allocating beam failure detection resources, comprising:
   determining control channel resource sets (CORESETs) configured by a network device for a terminal;
   determining whether each CORESET is configured with a higher layer signaling index;
   dividing the CORESETs having the same higher layer signaling index into a same group in response to each CORESET being configured with the higher layer signaling index;
   in response to a number of the CORESETs in a group being greater than a number of beam failure detection (BFD) resources supported by the terminal, selecting target CORESETs with a number of the BFD resources; and
   determining reference signal (RS) resources corresponding to transmission configuration indication (TCI) states of quasi co-locations (QCLs) of the selected target CORESETs as BFD RS resources.

2. The method of claim 1, further comprising:
   dividing all the CORESETs into one group in response to an CORESET not being configured with the higher layer signaling index.

3. The method of claim 1, wherein selecting the target CORESETs with the number of the BFD resources, comprises:
   in response to a number of CORESETs in the group being less than or equal to the number of BFD resources supported by the terminal, determining all the CORESETs in the group as the target CORESETs; and
   in response to the number of CORESETs in the group being greater than the number of BFD resources supported by the terminal, selecting the CORESETs with the number of BFD resources in a specified priority order as the target CORESETs.

4. The method of claim 3, wherein the specified priority order comprises one or more of:
   a priority order of identifier (ID) numbers of the CORESETs from small to large;
   a priority order of priorities corresponding to a cell common search space CORESET, a group common search space CORESET, and a user specific search space CORESET from high to low; and
   a priority order of intervals of monitoring the CORESETs by the terminal from small to large.

5. A device for allocating beam failure detection resources, comprising:
   a processor;
   a memory configured to store instructions executable by the processor; wherein, the processor is configured to:
   determine control channel resource sets (CORESETs) configured by a network device for a terminal;
   determine whether each CORESET is configured with a higher layer signaling index;
   divide the CORESETs having the same higher layer signaling index into a same group in response to each CORESET being configured with the higher layer signaling index;
   in response to a number of the CORESETs in a group being greater than a number of beam failure detection (BFD) resources supported by the terminal, select target CORESETs with a number of the BFD resources; and
   determine reference signal (RS) resources corresponding to transmission configuration indication (TCI) states of quasi co-locations (QCLs) of the selected target CORESETs as BFD RS resources.

6. A non-transitory computer-readable storage medium, wherein when instructions in the storage medium are executed by a processor of a mobile terminal, the mobile terminal is enabled to implement a method for allocating beam failure detection resources, the method comprising:
   determining control channel resource sets (CORESETs) configured by a network device for a terminal;
   determining whether each CORESET is configured with a higher layer signaling index;
   dividing the CORESETs having the same higher layer signaling index into a same group in response to each CORESET being configured with the higher layer signaling index;
   in response to a number of the CORESETs in a group being greater than a number of beam failure detection (BFD) resources supported by the terminal, selecting target CORESETs with a number of the BFD resources; and
   determining reference signal (RS) resources corresponding to transmission configuration indication (TCI) states of quasi co-locations (QCLs) of the selected target CORESETs as BFD RS resources.

7. The device of claim 5, wherein the processor is configured to:
   divide all the CORESETs into one group in response to an CORESET not being configured with the higher layer signaling index.

8. The device of claim 5, wherein the processor is configured to:
   in response to a number of CORESETs in the group being less than or equal to the number of BFD resources supported by the terminal, determine all the CORESETs in the group as the target CORESETs; and
   in response to the number of CORESETs in the group being greater than the number of BFD resources supported by the terminal, select the CORESETs with the number of BFD resources in a specified priority order as the target CORESETs.

9. The device of claim 8, wherein the specified priority order comprises one or more of:
   a priority order of identifier (ID) numbers of the CORESETs from small to large;
   a priority order of priorities corresponding to a cell common search space CORESET, a group common search space CORESET, and a user specific search space CORESET from high to low; and a priority order of intervals of monitoring the CORESETs by the terminal from small to large.

10. The storage medium of claim 6, wherein dividing the configured CORESETs into groups comprises:

dividing all the CORESETs into one group in response to an CORESET not being configured with the higher layer signaling index.

11. The storage medium of claim 6, wherein selecting the target CORESETs with the number of the BFD resources, comprises:

in response to a number of CORESETs in the group being less than or equal to the number of BFD resources supported by the terminal, determining all the CORESETs in the group as the target CORESETs; and in response to the number of CORESETs in the group being greater than the number of BFD resources supported by the terminal, selecting the CORESETs with the number of BFD resources in a specified priority order as the target CORESETs.

12. The storage medium of claim 11, wherein the specified priority order comprises one or more of:

a priority order of identifier (ID) numbers of the CORESETs from small to large;

a priority order of priorities corresponding to a cell common search space CORESET, a group common search space CORESET, and a user specific search space CORESET from high to low; and a priority order of intervals of monitoring the CORESETs by the terminal from small to large.

* * * * *